United States Patent [19]
Yamamura et al.

[11] Patent Number: 5,297,646
[45] Date of Patent: Mar. 29, 1994

[54] CONTROL SYSTEM FOR OPTIMIZING OPERATION OF VEHICLE PERFORMANCE/SAFETY ENHANCING SYSTEMS SUCH AS 4WS, 4WD ACTIVE SUSPENSIONS, AND THE LIKE

[75] Inventors: Tomohiro Yamamura, Yokosuka; Fukashi Sugasawa; Masatsugu Yokote, both of Yokohama, all of Japan

[73] Assignee: Nissan Motor Co., Ltd., Yokohama, Japan

[21] Appl. No.: 686,341

[22] Filed: Apr. 17, 1991

[30] Foreign Application Priority Data

| Apr. 18, 1990 [JP] | Japan | 2-104044 |
| Apr. 18, 1990 [JP] | Japan | 2-104045 |
| Apr. 18, 1990 [JP] | Japan | 2-104046 |

[51] Int. Cl.⁵ .............................. B62D 5/06
[52] U.S. Cl. .................... 180/142; 180/197; 180/248
[58] Field of Search ............ 180/142, 197, 248; 364/424.05, 424.01

[56] References Cited

U.S. PATENT DOCUMENTS

| 4,941,095 | 7/1990 | Imaseki et al. | |
| 4,998,593 | 3/1991 | Karnopp | 180/142 X |
| 5,020,619 | 6/1991 | Kanazawa | 180/142 X |
| 5,060,157 | 10/1991 | Tado | 364/424.05 |
| 5,062,658 | 11/1991 | Majeed | 364/424.05 X |
| 5,088,761 | 2/1992 | Takehara | 364/424.05 X |
| 5,103,397 | 4/1992 | Ikemoto | 364/424.05 |
| 5,119,297 | 6/1992 | Buma | 364/424.05 |
| 5,130,926 | 7/1992 | Watanabe | 364/424.05 |

FOREIGN PATENT DOCUMENTS

| 0269132 | 6/1988 | European Pat. Off. . |
| 0312096 | 4/1989 | European Pat. Off. . |
| 3520884 | 1/1986 | Fed. Rep. of Germany . |
| 3912349 | 11/1989 | Fed. Rep. of Germany . |
| 59-77968 | 5/1984 | Japan . |
| 61-157437 | 7/1986 | Japan . |

*Primary Examiner*—Richard A. Schacher
*Attorney, Agent, or Firm*—Foley & Lardner

[57] ABSTRACT

Vehicular acceleration is sensed and used to set and/or modify at least two of a plurality of control sensitivity values in a manner which increases one with respect to the other and thus avoids the situation wherein a limited amount of servo power is wasted by futile operation of a servo powered arrangement which cannot produce a large control effect under the instant operating conditions and enables an adequate amount servo power to be directed to the operation of a different arrangement which can be effective.

14 Claims, 9 Drawing Sheets

CONTROL SYSTEM FOR OPTIMIZING OPERATION OF VEHICLE PERFORMANCE/SAFETY ENHANCING SYSTEMS SUCH AS 4WS, 4WD ACTIVE SUSPENSIONS, AND THE LIKE

BACKGROUND OF THE INVENTION

1. Field of the Invention

The present invention relates generally to a vehicle which is equipped with a number of performance/safety enhancing arrangements such as four wheel steering, four wheel drive, active suspension and the like type of systems and more specifically to a control which integrates and optimizes the operation of the same.

2. Description of the Prior Art

JP-A-59-77968 discloses an example of a 4WS steering arrangement wherein, when the vehicle speed is low and the steering of the front wheels is large, reverse phase steering of the rear wheels is implemented to reduce the turning circle. On the other hand, when the vehicle speed is high and the steering angle of the front wheels is relatively small, inphase steering of the rear wheels is implemented for the sake of cornering stability.

JP-A-61-157437 discloses an example of a four wheel drive arrangement wherein when wheel slip occurs the distribution of drive power to the vehicle wheels is adjusted in a manner which improves stability during sudden applications of power, acceleration etc.

However, when the above mentioned 4WS and 4WD systems are both utilized in the same vehicle, the combined effect of the two systems is apt not to be optimal. The reason for this is that consideration has not been given to the overall system and the sensitivities of the auxiliary steering control of the 4WS and the driving force distribution control of the 4WD are set individually and arranged so that they operate independently of one another. Conditions which induce a large response in the auxiliary steering system are different from those which induce a similarly large response in the drive power distribution. Accordingly, when one system is put into effect the other tends to remain dormant and does not supplement the effect of the one which is currently effective. Even when both of the systems are simultaneously active, as the two systems are controlled independently of one another, still the effect of one tends to be small and the total effect promimates that which could be achieved by equipping the vehicle with only one of the two arrangements. Further, the provision of the two systems undesirably increases the total energy consumption with respect to the total effect which is achievable.

It has been thought to link the two systems in a manner which provides a cooperative control between the two systems with a view of improving a given facet of one control, or modifying one control to compensate for the degradation of the performance of the other system. Nevertheless, the effect is limited to given facets of operation and the overall on total performance of the two systems is not synergistically improved.

SUMMARY OF THE PRESENT INVENTION

It is an object of the present invention to provide a control arrangement which integrates the operation of arrangements such as 4WS auxiliary steering and 4WD power/braking distribution and the like, in a manner wherein the total effect of the systems tends to be optimized.

In brief, this object is achieved by an arrangement wherein vehicular acceleration is sensed and used to set and/or modify at least two of a plurality of control sensitivity values in a manner which increases one with respect to the other and thus avoids the situation wherein limited servo power is wasted through the futile operation of a servo powered arrangement or arrangements which cannot produce a large control effect under the instant operating conditions and therefore enables an adequate amount of servo power to be directed to the operation of a system which can be highly effective at that time.

More specifically a first aspect of the invention comes in a vehicle which features: a first control system which controls one of an auxiliary steering arrangement, a drive power distribution arrangement and a wheel load distribution arrangement; a second control system which controls another of an auxiliary steering arrangement, a drive power distribution arrangement and a wheel load distribution arrangement; an acceleration sensor means for sensing at least one of longitudinal and lateral acceleration of the vehicle; and control sensitivity setting means which is responsive to said acceleration sensor means for setting the control sensitivity of the first and second control systems in a manner wherein one of the control sensitivities is varied with respect to the other in response to a change in the magnitude of the output of said acceleration sensor means.

A second aspect of the invention comes in a vehicle which features: at least two of an auxiliary steering control system, a drive power distribution system and a wheel load distribution system; acceleration sensor means; and control sensitivity setting means for varying the control sensitivities of the at least two of the auxiliary steering control system, a drive power distribution system and a wheel load distribution system, in response to the output of the acceleration sensor means, said control sensitivity setting means varying the magnitude of a first of the control sensitivities with respect to a second of the control sensitivities in response to a change in the magnitude of a parameter which varies with the output of said acceleration means.

A third aspect of the present invention comes in a vehicle which is quipped with: a vehicle acceleration sensing means; an auxiliary steering arrangement for varying the steering angle of at least one of a set of front and rear road wheels, said auxiliary steering arrangement including an auxiliary steering control unit which responds to a first set of control data input according to a first control sensitivity; a four wheel drive system including clutch means for varying the distribution of torque between the front road wheels and the rear road wheels of the vehicle, said four wheel drive system including a drive power distribution control unit which responds to a second set of control data input according to a first control sensitivity; and control sensitivity setting means for varying the first and second control sensitivities in response to the output of the acceleration sensor means, said control sensitivity setting means varying the magnitude of the first control sensitivity with respect to the second control sensitivities in response to a change in the magnitude of a parameter which varies with the output of said acceleration means.

A further aspect of the present invention comes in a method of operating a vehicle system having first and second systems which modify vehicle handling and which method features the steps of: sensing longitudinal vehicular acceleration; sensing lateral vehicle acceleration; determining the value of a first control sensitivity value which determines level of activity of the first system and a control gain value based on a parameter which varies as the sum of the squares of the longitudinal and lateral accelerations; determining the value of a second control sensitivity value which determines level of activity of the second system based on a parameter which varies as a ratio of the longitudinal and lateral accelerations; and modifying the value of second control sensitivity value using the control gain value.

Another aspect of the present invention comes in a method of operating a vehicle system having first and second systems which modify vehicle handling, and which features the steps of: sensing one of longitudinal and vehicular vehicle acceleration; and increasing a first control sensitivity value which determines level of activity of the first system with respect to a second control sensitivity value which determines level of activity of the second system, in response to an increase in the sensed vehicular acceleration.

A further aspect of the present invention comes in a method of operating a vehicle system having first and second systems which modify vehicle handling, the method featuring the steps of: sensing one of longitudinal and vehicular vehicle acceleration; and increasing a first control sensitivity value and decreasing a second control sensitivity value which determines level of activity of the second system, in response to an increase in the sensed vehicular acceleration.

A yet further aspect of the present invention comes in a vehicle which features: first and second systems which modify vehicle handling; mean for sensing longitudinal vehicular acceleration; means for sensing lateral vehicle acceleration; means for determining the value of a first control sensitivity value which determines level of activity of the first system and a control gain value based on a parameter which varies as the sum of the squares of the longitudinal and lateral accelerations; means for determining the value of a second control sensitivity value which determines level of activity of the second system based on a parameter which varies as a ratio of the longitudinal and lateral accelerations; and means for modifying the value of second control sensitivity value using the control gain value.

Another aspect of the present invention comes in a vehicle which features: first and second systems which are operatively connected with a road wheel of the vehicle; means for sensing one of longitudinal and vehicular vehicle acceleration; and means for increasing a first control sensitivity value which determines level of activity of the first system with respect to a second control sensitivity value which determines level of activity of the second system, in response to an increase in the sensed vehicular acceleration.

Yet another feature of the present invention comes in a vehicle which features: first and second systems which are operatively connected with a road wheel of the vehicle; means for sensing one of longitudinal and vehicular vehicle acceleration; and means for increasing a first control sensitivity value and decreasing a second control sensitivity value which determines level of activity of the second system, in response to an increase in the sensed vehicular acceleration.

Another aspect of the present invention comes in a vehicle which features: a source of servo power, said source being limited for the purposes of increasing fuel economy; a first and second systems which are operated by the servo power; first and second control units which control the plurality of first and second systems, said first and second control units including means responsive to first and second control sensitivity values, respectively; sensor means for determining vehicle operation; and control sensitivity value setting means which is responsive to the sensor means and which increases the first control sensitivity value with respect to the second control sensitivity value in a manner which permits efficient operation of the first and second systems on the limited servo power.

DETAILED DESCRIPTION OF THE PREFERRED EMBODIMENTS

Figure 1:
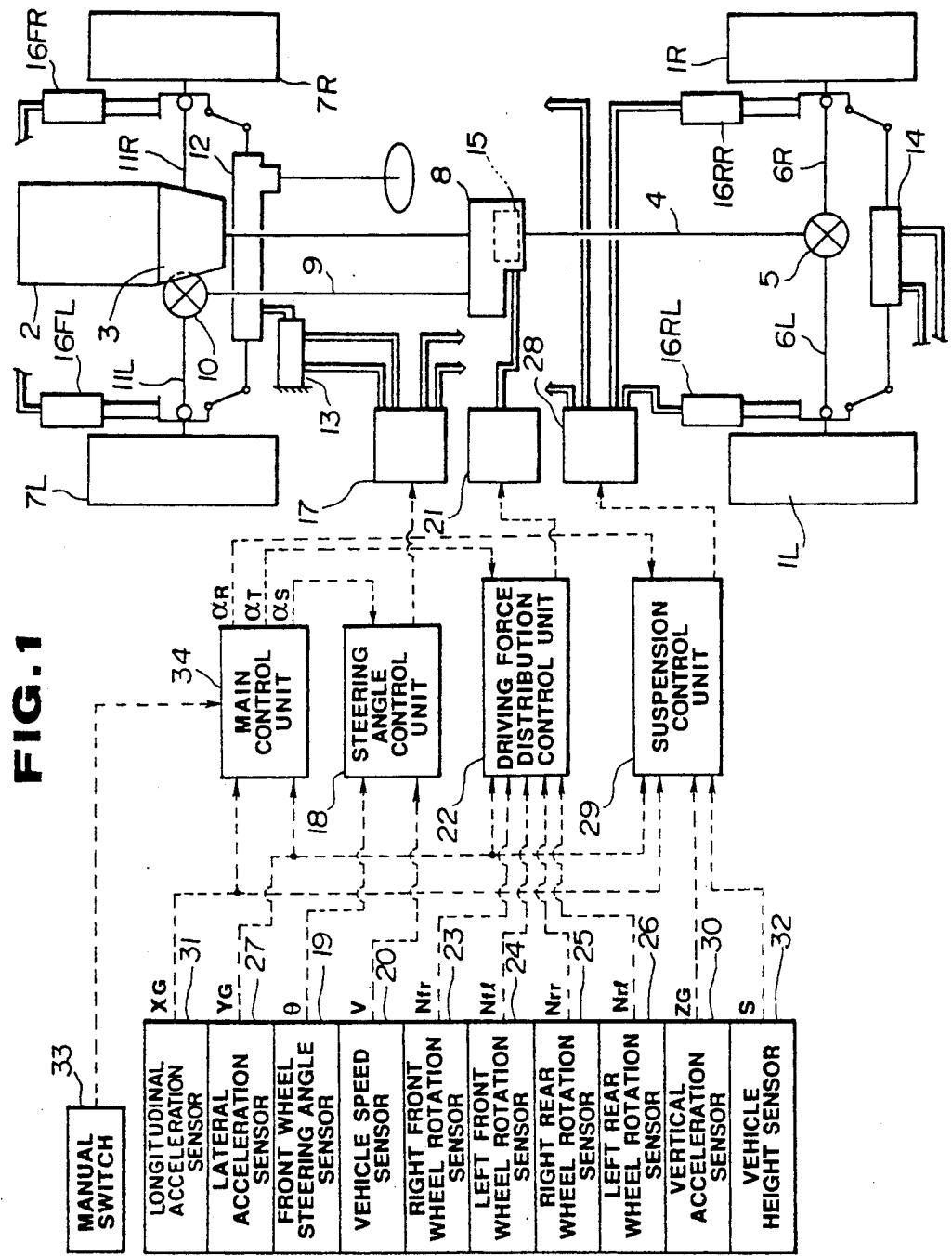
FIG. 1 is a schematic layout of a vehicle system which incorporates 4WS, 4WD and active suspension systems and a control system according to a first embodiment of the present invention.

FIG. 1 shows a system to which the embodiments of the present invention are applied. As shown, this arrangement includes 4WS, 4WD and an active suspension system which respectively define examples of an auxiliary steering, braking/power distribution and wheel load distribution arrangements to which the present invention is applicable.

The 4WD system is basically a F-R (front engine-rear wheel drive) type drive train which includes a transfer gear via which a portion of the drive torque can be split off and supplied to the front wheels. More specifically, the illustrated arrangement comprises an engine 2, a transmission 3, a rear propeller shaft 4, a rear differential or final drive 5, left and right rear drive shafts 6L and 6R, rear wheels 1L and 1R, a transfer unit 8, a front propeller shaft 9, a front differential for final drive 10, left and right front drive shafts 11L and 11R and front road wheels 7L and 7R.

A forward hydraulic cylinder or servo 13 is operatively connected with the front wheels 7L, 7R by way of a front steering gear unit 12. This cylinder 13 is adapted to modify the amount of steering (steering angle) of the front wheels due to the operation of steering gear unit 12 in accordance with the hydraulic pressure which is supplied thereto.

A rear hydraulic cylinder or servo 14 is operatively connected with the rear wheels in a manner to modify the steering angle of the same in response to a hydraulic control signal which is applied thereto.

A hydraulically operated multiple plate clutch 15 is included in the transfer unit and serves to control the amount of torque which is supplied to the front wheels.

Hydraulic suspension struts 16FR 16FL, 16RR and 16RL which form part of an active vehicle suspension are operatively disposed between the vehicle chassis and the front and rear road wheels.

Figure 2:
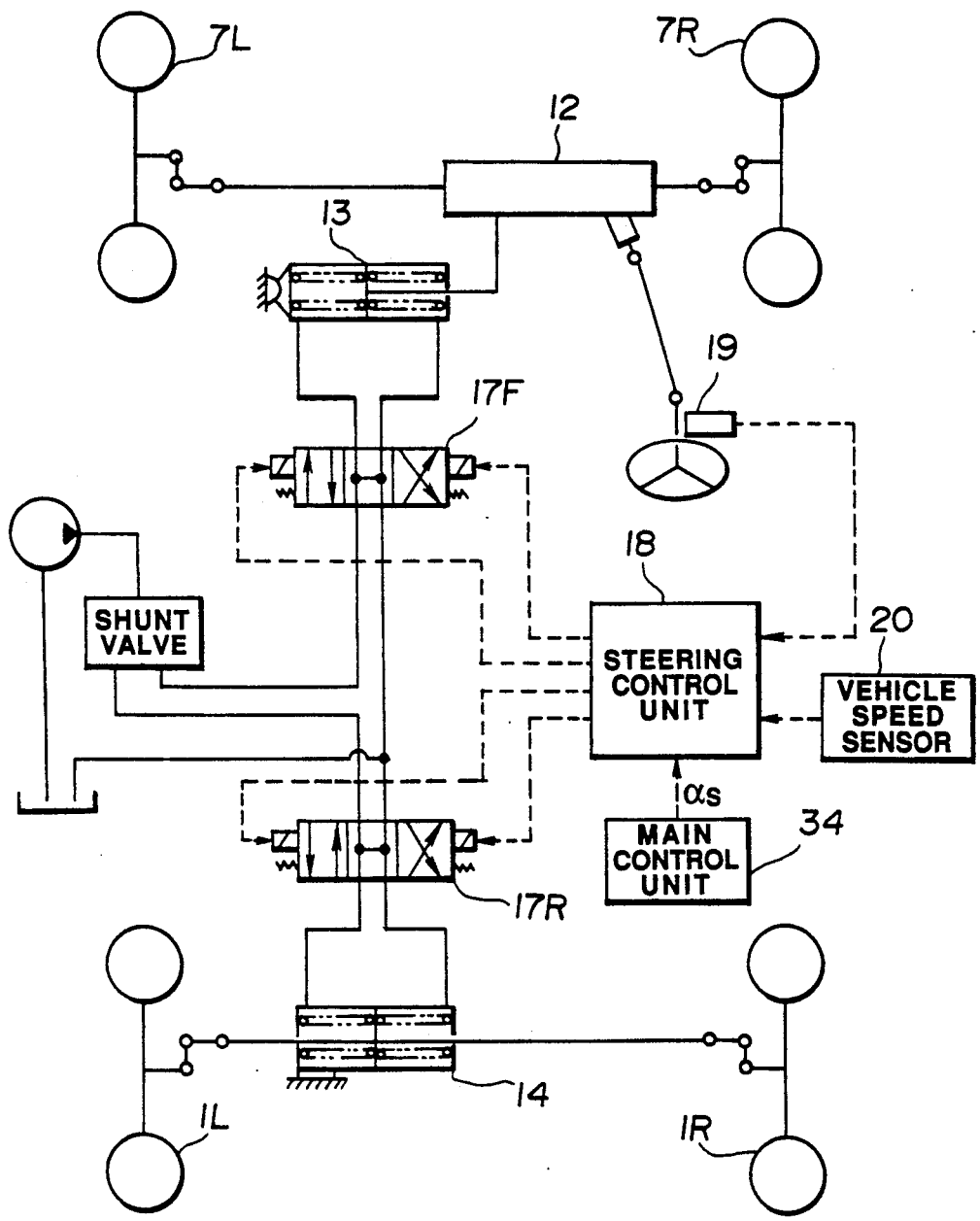
FIG. 2 is a schematic diagram showing details of the hydraulic control system utilized in the 4WS system.

A steering angle control unit 18 controls the hydraulic fluid pressure which is supplied to the front and rear auxiliary steering hydraulic cylinders 13 and 14. As shown in FIG. 2, the auxiliary steering angle control unit 18 receives data inputs from a front wheel steering angle sensor 19 and a vehicle speed sensor 20 and is arranged to supply control signals to solenoids which are associated with pressure control valves 17F and 17R in response to the data inputs. When the vehicle is turning, the inputs are compared with a simulation model which enables the auxiliary steering angle and changes in phase to be determined in a manner promotes the a desired level of yaw and steering response and stability for the instant set of conditions. By way of example, the auxiliary steering can be controlled in a manner wherein the rear wheels are initially steered in a direction which tends to increase the tendency for the vehicle yaw and produce a relatively high yaw rate. Following this initial steering, the phase is changed in a manner which tends to attenuate excessive yaw and stabilizes the cornering charactistics of the vehicle which has thus been suitably conditioned to traverse the corner.

Figure 3:
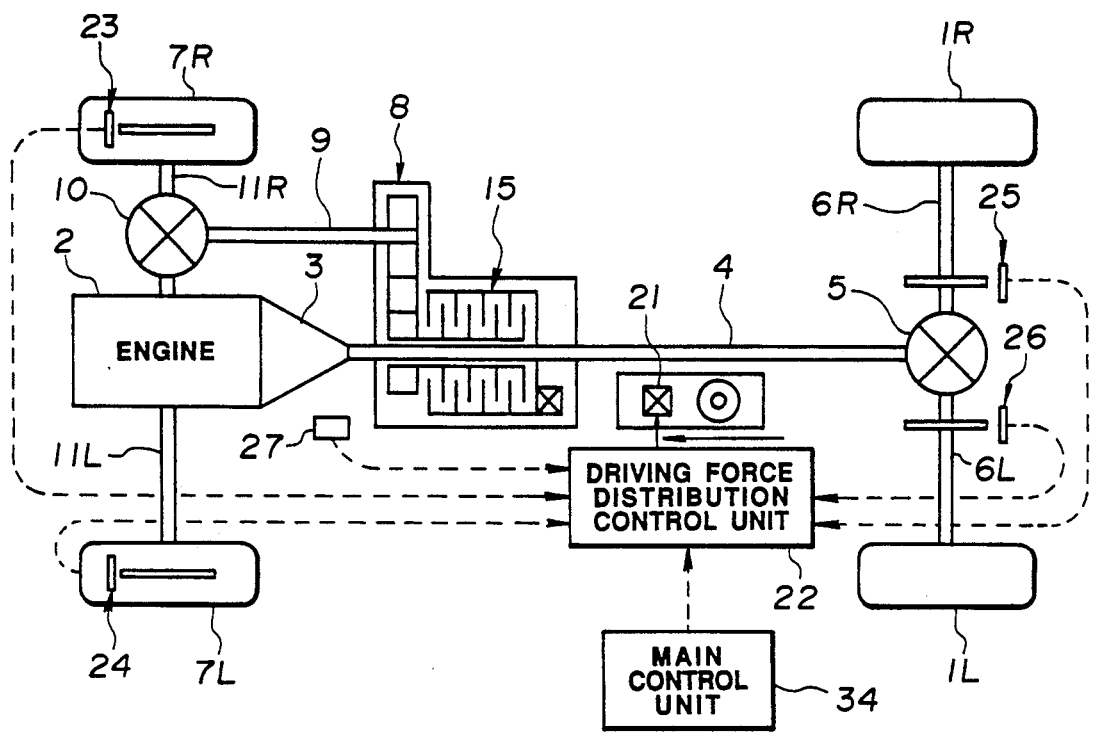
FIG. 3 is a schematic diagram showing details of the drive train and sensor arrangement utilized in the 4WD system.

A valve 21 which is operated under commands from a driving force distribution control unit 22 (see FIG. 3) controls the level of the hydraulic pressure which is supplied to the multi-plate clutch 15. As shown, this control unit 22 receives data inputs from wheel speed sensors 23-26 which are each associated with one of the road wheels, and a lateral acceleration sensor 27. The level of the hydraulic pressure which is supplied to the clutch 15 is varied between that at which all of the drive torque is supplied to the rear wheels (0:100) and that wherein the torque is split 50:50 between the front and rear wheels. Basically, the control of the clutch engagement is such as to reduce wheel slip during start off and acceleration and to improve driving and cornering performance.

Figure 4:
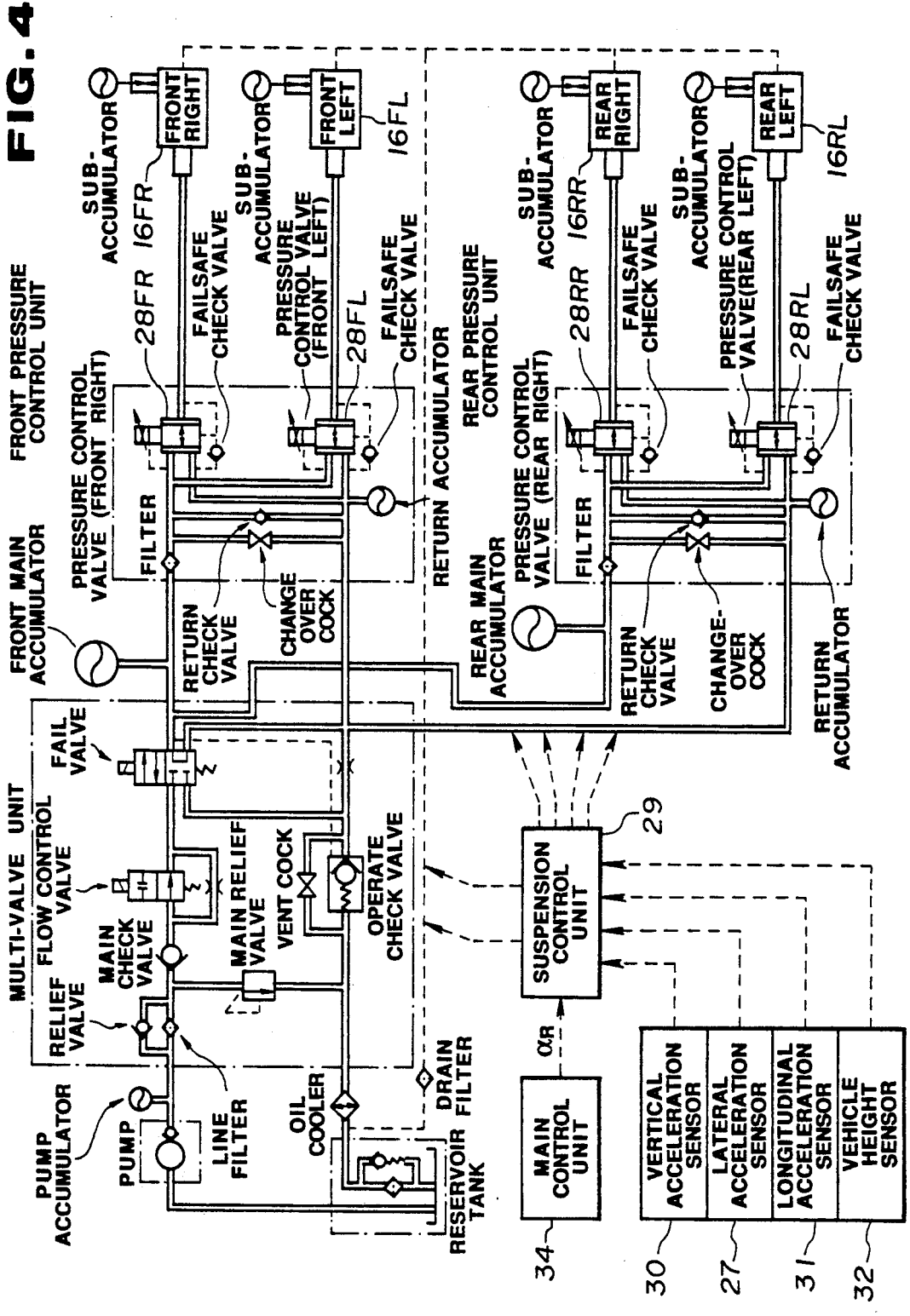
FIG. 4 is a schematic diagram showing details of the active suspension system.

The supply of hydraulic fluid under pressure to the suspension struts 16FR, 16FL, 17RR and 17RL is controlled by valve operation control signals generated by a suspension control unit 29 which, as shown in FIG. 4, receives data inputs from a vertical acceleration sensor 30, the lateral acceleration sensor 27, a fore and aft or longitudinal acceleration sensor 31, and a vehicle height sensor 32. Basically, the suspension control unit is arranged to attenuate vertical bounding, rolling, pitching and changes in vehicle height.

A main control unit 34 is operatively connected with each of the above mentioned control units 18, 22 and 29 and arranged to control the sensitivity with which each of the units responds to the respective data inputs. This main control unit 34 receives data inputs from the lateral and longitudinal acceleration sensors 27, 31 and a manual switch 33, and uses $(X_G^2+Y_G^2)$ and $(X_G/Y_G)$ parameters to discriminate between regions wherein the control effect of a given system is large and those wherein the control effect is small.

Based on the above mentioned discrimination, an auxiliary steering angle control sensitivity value œS, a driving force distribution control sensitivity value œT, and a wheel load distribution control sensitivity value œR are developed and supplied to the respective control units 18, 22 and 29.

The manual switch 33 is arranged so as to enable a driver to select a control mode according to taste and intention. In this instance two modes are provided, the first (A) permits the driving force characteristics to be weighted, and a second (B) which enables the turning or cornering characteristics to be weighted.

According to the present invention the $(X_G^2+Y_G^2)$ and the $(X_G/Y_G)$ parameters are used to divide the vehicle operating conditions according to control effect. The reason these $(X_G^2+Y_G^2)$ and $(X_G/Y_G)$ control parameters are used to set the control sensitivities œS, œT and œR is as follows:

The control sensitivities œS, œT and œR vary with the above mentioned $(X_G^2+Y_G^2)$ and the $(X_G/Y_G)$ parameters because:

The braking and driving force control is basically a slip ratio control via which the driving or braking force distribution is controlled and its effect is large in vehicle operational zones wherein large driving/braking forces are large and slip ratios are accordingly large. In other words the braking/driving force control is of importance in zones or regions wherein longitudinal acceleration is large.

The wheel load distribution control varies with the amount of movement of the load from one side to the other or in the fore and aft direction (viz., from the front wheel to the rear ones and vice versa). In other words, this control is such as to control the traction between the tires and road to improve cornering (tire cornering power) and acceleration/deceleration and thus is most effective when the lateral and the fore and aft (longitudinal) accelerations are large. The effect of the lateral acceleration is weighted as this is the most commonly experienced acceleration and occurs even when the vehicle is not being subjected to acceleration/deceleration.

The auxiliary steering control is effective in a range wherein the tire cornering power is linear to a range wherein it exhibits non-linear characteristics. This particular control exhibits a large effect wherein the tire cornering characteristics are linear as the other control apparatus exhibits large control effects when the tire concerning power becomes non-linear. Thus, the control effect of the auxiliary steering is considered to be large when the lateral and longitudinal accelerations are small.

Figure 5:
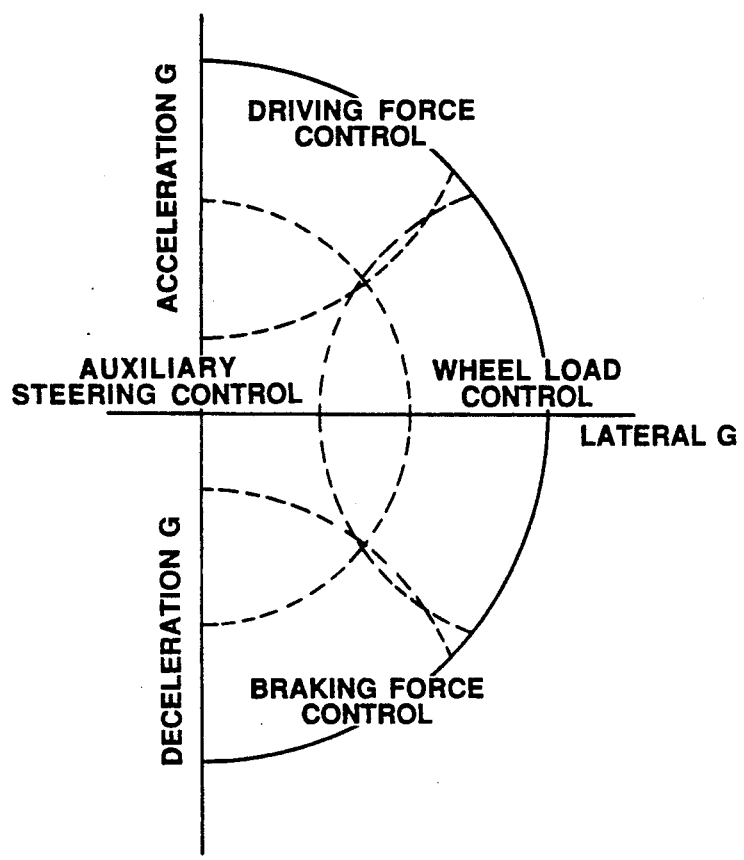
FIG. 5 is a diagram showing the regions or zones in which each of the systems illustrated in FIG. 1 produces its maximum control effect.

FIG. 5 diagrammatically illustrates the above mentioned zones and the manner in which they are distributed with respect to X and Y direction accelerations.

It should be noted that a number of problems are encountered when the control sensitivities are fixed.

(A) When the ($X_G^2+Y_G^2$) parameter is small the auxiliary steering angle control is performed efficiently and alone is adequate and no braking/driving power distribution control is required. Under these conditions operating more than one control system wastes power. Even when a large amount of power is required for auxiliary steering purposes, as the total power output by the hydraulic power source is limited for the sake of reducing parasitic losses and improving fuel economy, a problem (that is, an insufficient amount of servo power for the steering control) is encountered if both of the auxiliary steering and the braking/driving power distribution systems are simultaneously operated.

Further, as the braking/driving force distribution changes, the front wheel cornering power also changes so that the control effect provided by the auxiliary steering, which operation is based on the assumption that the front cornering power does not change, is interfered with and an optimal effect cannot be obtained.

Under these conditions if the wheel load distribution control is used, the effect is similar to that caused by the operation of the braking/driving force control in that power is wasted and adequate power for the auxiliary steering cannot be obtained. Further, as modifying the wheel load affects the steering control (viz., the balance of the front and rear cornering power is changed) and the auxiliary steering control is exclusively based on the assumption that steering control is constant, interference with the steering control is possible.

(B) When ($X_G^2+Y_G^2$) is large and ($X_G/Y_G$) is small the wheel load distribution is performed with high efficiency.

However, under these conditions if the auxiliary steering control is employed, power is wasted and adequate servo power for the load distribution control cannot be obtained. Further, when auxiliary steering control is employed, the tire slip angle changes and thus changes the direction of the lateral and longitudinal forces which are applied to the tires and thus changes the amount of movement of the wheel loads. Viz., a lateral slip angle is produced toward the inside of the turn curve and decreases the front inner wheel load and increases the rear outer wheel load (when the rear wheels are steered in the reverse phase). Accordingly, the conditions before the wheel load distibution control is performed are changed by the auxiliary steering effect and thus the full effect of the wheel load distribution control cannot be obtained due to the tendancy for the auxiliary steering to interfere with the same.

If the braking/driving force control is utilized, power is wasted by the operation of this system and sufficient servo power cannot be supplied to the wheel load distribution control arrangement. Further, the front and rear slip ratio changes as a result of the operation and changes the driving force distribution. Thus, even though the wheel load distribution control aims at controlling the cornering forces produced at each of the road wheels to an optimum value, changes in the slip ratios interfere with the achievement of the same.

(C) When both ($X_G^2+Y_G^2$) and ($X_G/Y_G$) are large the braking/driving force control exhibits a high efficiency.

However, under these conditions, the operation of the auxiliary steering control wastes the limited amount of servo power available and the maximum requirements of the braking/driving distribution control system cannot be met. Further, when auxiliary steering is carried out, the tire slip angle changes and changes the direction in which the lateral and longitudinally acting forces are applied to the tires. This changes the amount of movement of the road wheel load. Viz., a lateral slip angle is produced toward the inside of the turning curve and decreases the front inner wheel load causing the same to race when the rear wheels are steered in the opposite direction. The wheel load change changes the slip ratios for the respective wheels. Finally, the front and rear wheel speed difference depends on the presence of the auxiliary steering angle and desired control cannot be realized.

When the wheel load distribution control is utilized, power is wasted by the operation of the same which wastes essential servo power. Further, when the operation of this system reduces the load on a wheel, the slip factor for that wheel increases so that that wheel tends to race. As the front and rear wheel speed difference is dependent upon the wheel load distribution control, optimal control is not achieved.

OPERATION

Figure 6:
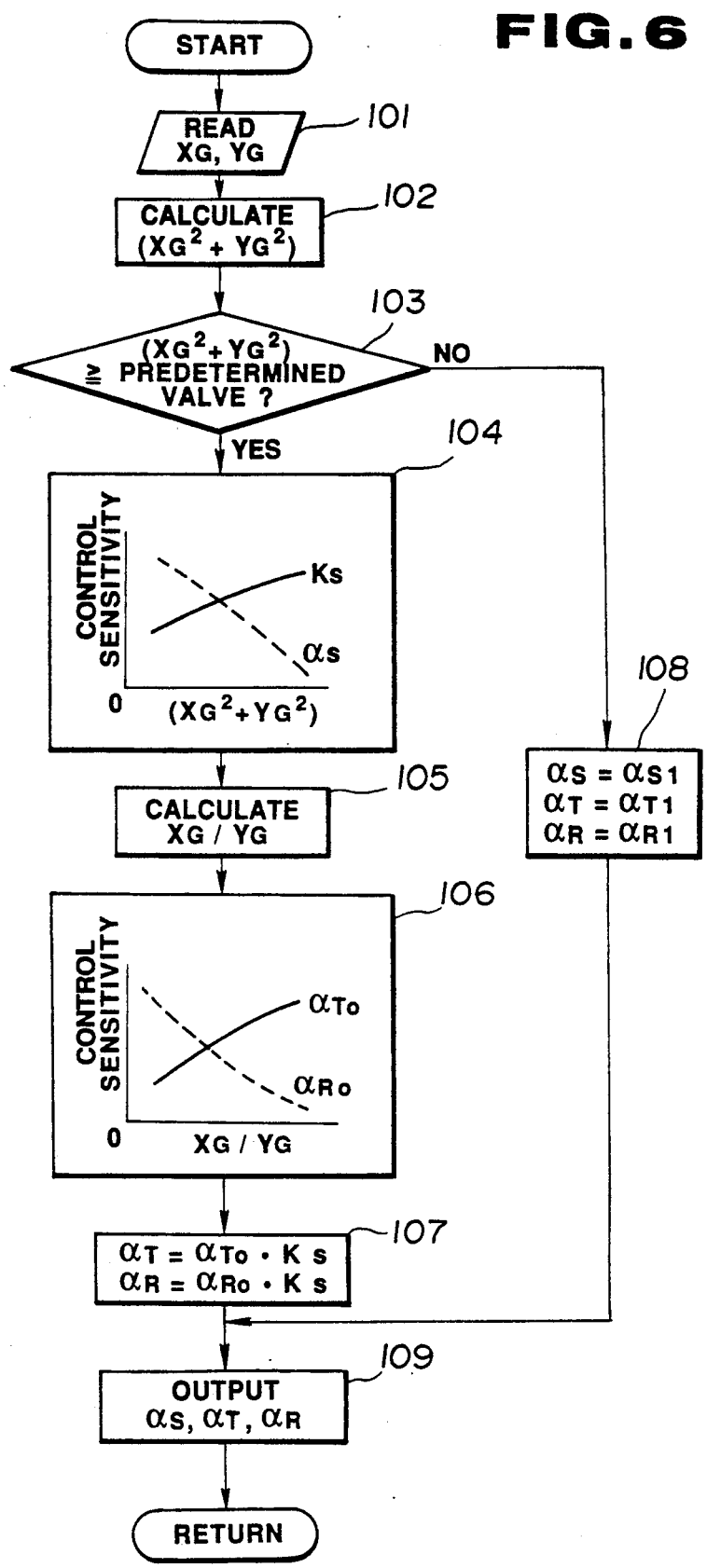
FIG. 6 is a flow chart depicting the steps which characterize the operation of the first embodiment of the present invention.

FIG. 6 shows, in flow chart form, the basic steps or operations which are carried out by a routine which is run in the main control unit 34 in connection with the setting of the control sensitivities œS, œT and œR which are issued to the respective control units 18, 22 and 29.

At step 101, the output of the switch 33 and the signals from the lateral and longitudinal acceleration sensors 27 and 31 are read and suitably stored in memory. At step 102 the sum of the squares of the lateral and longitudinal accelerations, is derived and compared with a predetermined value in step 103. If the sum is less than the predetermined value, the routine goes to step 108 wherein the auxiliary steering control senstivity œS, the driving force distribution control sensitivity œT and the wheel load distribution sensitivity are set to œS1, œT1 and œR1 resepectively. The values of œT1 and œR1 are much lower than the œS1 value in order to ensure that the auxiliary steering effect is the most predominant. By way of example if œS1=0 then œT1 and œR1 both approximate zero.

However, in the event that ($X_G^2+Y_G^2$) is found to be gerater than the above mentioned predetermined value in step 103 then the routine flows to step 104 wherein the auxiliary steering control sensitivity œS and control gain Ks are derived by look-up using mapped data for the instant value of ($X_G^2+Y_G^2$). The setting of the switch 33 determines which mapped data is used to obtain œS and Ks.

Figure 10:
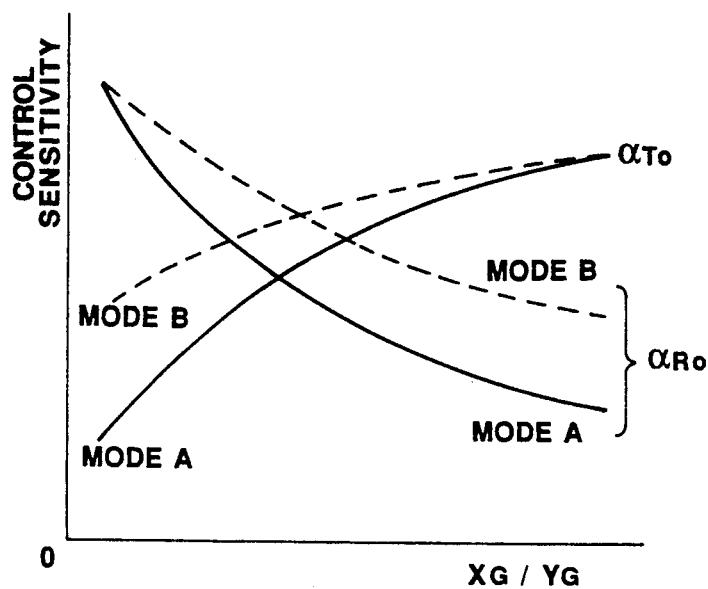
FIG. 10 is a grapical representation of mapped data used in connection with the first embodiment.
Figure 11:
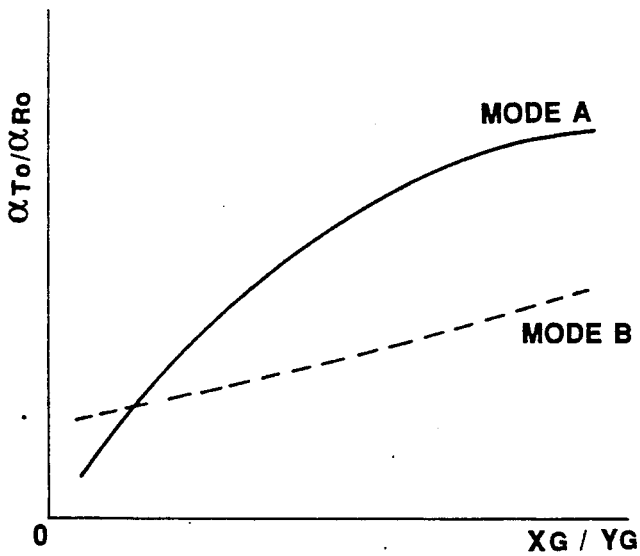
FIG. 11 is a graphical representation showing an alternative manner in which data used in connection with the execution of the present invention can be arranged.

Normally, the value of œS decreases with an increase in ($X_G^2+Y_G^2$) while Ks increases with the increase thereof. Following this, the value of ($X_G/Y_G$) is derived in step 106 and subsequently used in a table look-up (using data of the nature shown in FIG. 10) to derive basic driving force control and wheel load distribution senstivities œTo and œRo. In this case also, the data from which the œTo and œRo values are derived is determined by the setting of manual switch 33 (note the difference in the mode A and mode B traces in FIG. 10).

As shown, the values of œTo and œRo normally increase and decrease, resepectively, with the increase in ($X_G/Y_G$). Following the derivation of these values a driving force distribution control sensitivity œT and a wheel load distribution control sensitivity œR are calculated using the following equations:

$$œT = To \times Ks \qquad (1)$$

$$œR = œRo \times Ks \quad (2)$$

After this derivation, the values of œS, œT and œR are output to the respective control units or controllers 18, 22 and 29 as they will be referred to hereinafter.

In response to the input of the œS value the steeing angle controller 18 derives target auxiliary front and rear steering angles $\partial F^*$ and $\partial R^*$ by multipying front and rear basic control steering angle values fsf and fsr by the œS value. Viz.:

$$\partial F^* = œS \times fsf(\phi, V) \quad (3)$$

$$\partial B^* = œS \times fsr(\phi, V) \quad (4)$$

where:
  $\phi$ denotes the output of the front wheel steering sensor, and
  V denotes vehicle speed.

The driving force distribution controller 22 responds to the input of the œT value by deriving a target front wheel ratio value TF* using the following equation:

$$TF^* = œT \times fT(\Delta N, YG) \quad (5)$$

where ΔN denotes the difference in speed between the front and rear wheels and is derived using equation (6).

$$\Delta N = Nr - Nf \quad (6)$$

where Nf and Nr denote the front and rear wheels speeds as indicted by the rotational speed sensors 23-26.

The suspension controller 29 derives a target wheel load distribution value ratio RS* by obtaining the product of a basic front wheel load distribution ratio fR and the wheel load distribution sensitivity value œR. Viz.:

$$RS^* = œR \times fR(Z_G, X_G, Y_G, S) \quad (7)$$

where $Z_G$, $X_G$, $Y_G$ denote the vertical, lateral and longitudinal accelerations and S denotes vehicle height.

With the above type of control the following effects are derived.

Figure 7:
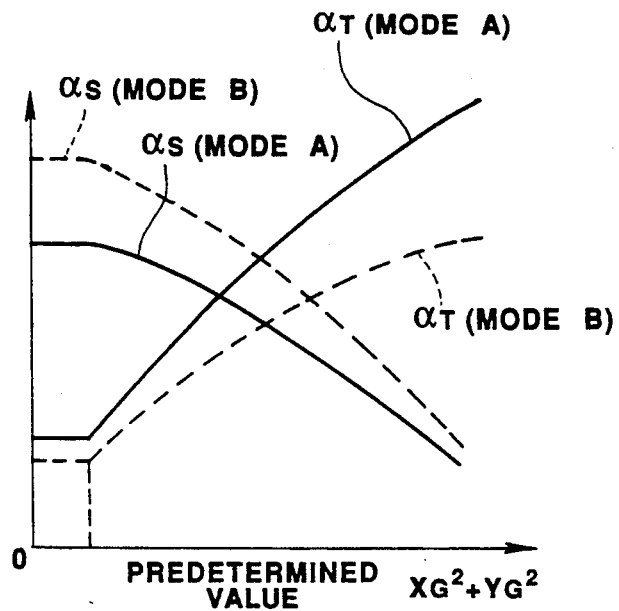
FIG. 7 depicts mapped data which is used to determined the auxiliary steering angle and the driving force distribution with respect to a control value $(X_G^2 + Y_G^2)$ which varies with the sum of the square of lateral and longitudinal accelerations of the vehicle.
Figure 8:
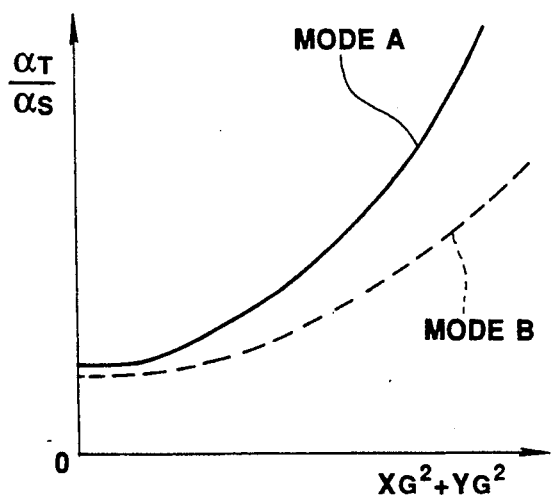
FIG. 8 is a graph which depicts the manner in which the ratio of auxiliary steering and power distribution control sensitivities varies with respect to the sum of the square of lateral and longitudinal vehicular accelerations.

1. Vehicle operation can be divided into regions based on the $(X_G^2 + Y_G^2)$ parameter and as indicted in FIG. 7 arranged such that when the value of $(X_G^2 + Y_G^2)$ is low the value assumes œS is relatively high value as compared with œT. This is effective to suppress changes in the driving force distribution control and to ensure that auxiliary steering of the front and rear wheels is carried out with the required efficiency.

When the value of $(X_G^2 + Y_G^2)$ increases, the value of œT increases with respect to the œ S value so as to suppress variations in the slip ratios which would tend to be produced by changes in the steering angles and ensures that the driving force distribution exhibits its maximum effect.

2. Even though the amount of servo power which is available for implementing the control of the auxiliary steering and drive power distribution systems is limited, there is no undesirable limiting of the operation of a system which is able to produce an effective control effect under the instant set of operating conditions due to the activity of a system which is not able to produce such a control effect under the same conditions.

3. The provision of the manual switch 33 enables the driver to select between mode A wherein greater weight is given to the driving force distribution characteristics or mode B wherein the weight is shifted to the steering control. This renders is possible for the driver to conciously modify the operation of the system according to his intention/taste.

SECOND EMBODIMENT

The second embodiment is applicable to a vehicle system which is not equipped with a controllable active suspension and is directed to the control of the auxiliary steering and drive power distribution. For the sake of explanation, it will be assumed that the vehicle system to which the second embodiment is applied is essentially the same as that shown in FIG. 1 minus the active suspension system. In this embodiment the control is based on the output of the fore and aft or longitudinal sensor 31 alone and the YG value is ignored.

The ramification of this is that the number of sensors required to enable the operation of the second embodiment can be reduced as compared with the first one.

Figure 9:
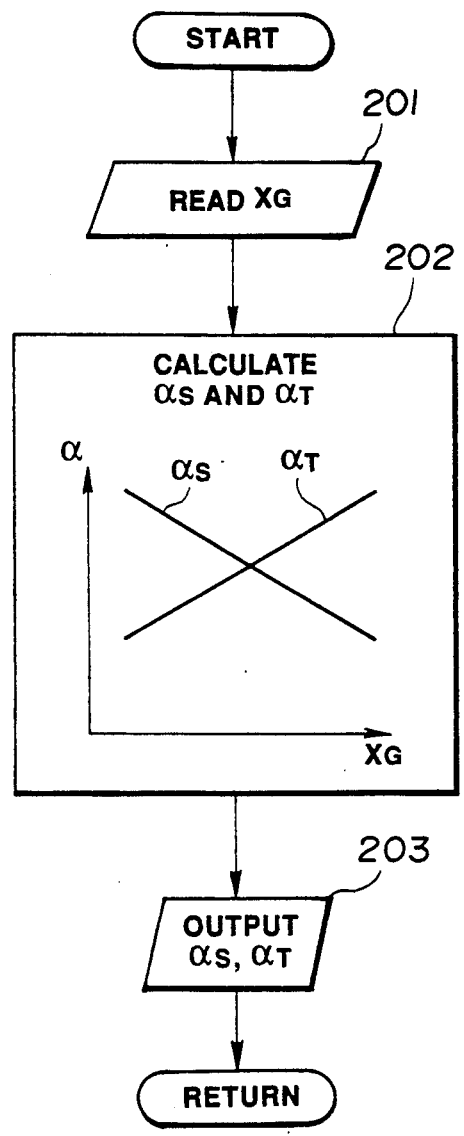
FIG. 9 is a flow chart which shows the steps involved in setting the control sensitivities in accordance with a second embodiment of the present invention.

FIG. 9 shows a flow chart which depicts the steps which characterize the control sensitivity according to the second embodiment. The first step of this routine is such as to read in the output of the longitudinal acceleration sensor 31 and set this value in memory. In step 202 the auxiliary steering angle control sensitivity œS and the drive force distribution control sensitivity œT are derived by look-up, using mapped data of the nature graphically depicted. As shown, this data is arranged so that the value of œS decreases from a relatively high value with the increase in the value of XG while the value of œT exhibits the reverse characteristics.

At step 203 the values of œS and œT are output to the controllers 18 and 22.

This embodiment is thus able to ensure that under conditions wherein one of the two systems alone can provide efficient control characteristics, the operation of the other is attenuated and thus enables all of the limited amount of servo power to be directed to the operation of one system and thus ensures that said operation is implemented to the required degree.

THIRD EMBODIMENT

A third embodiment of the invention is essentially similar to the second but is applied to a vehicle wherein an active suspension is provided and the drive force distribution system is omitted. In other words, this embodiment is readily applicable to pure FR of FF type power trains. In this instance the embodiment features the use of the output of the lateral acceleration sensor 27 (YG) in lieu of the fore and aft or longitudinal acceleration XG. In this embodiment sensitivity values œS and œ R for the auxiliary steering and wheel load distribution controls are determined by look-up and signals indicative thereof issued to the controllers 18 and 29.

ALTERNATIVE ARRANGEMENTS

Although the above embodiments have been disclosed as using data of the nature wherein traces of the œ To and œ Ro values, cross, it will be noted that the present invention is not limited to the same and it is possible to arrange the data in a manner wherein the œ To/œ Ro value increases with the increase in the XG/XY value.

It will be further appreciated that the present invention is not limited to the types of devices and systems which are illustrated in the drawings and that various changes and modifications in the systems and number of systems can be made without departing from the spirit of the invention. For example, it is possible to apply the instant invention to vehicles which have no auxiliary steering system but which are equipped with an active suspension and a 4WS having a drive force distribution arrangement.

Alternatively, the drive force control arrangement may take the form of a traction control unit, an anti-wheel lock type braking system or the like type of anti-skid system and may be alternatively arranged to control the left-right type of power distribution as different from/or in addition to fore-aft type power distribution.

The wheel load distribution control arrangement on the other hand, can alternatively be arranged to control rolling and pitching rigidity, can include an air (pneumatic) type suspension struts or be arranged to control the spring and attenuation constants, etc.

What is claimed is:

1. In a vehicle:
   a first control system which controls an auxiliary steering arrangement;
   a second control system which controls; a drive power distribution arrangement;
   acceleration sensor means for sensing longitudinal acceleration of the vehicle; and
   control sensitivity setting means responsive to said acceleration sensor means for setting first and second control sensitivities of the first and second systems in a manner wherein the second control sensitivity of said second control system is increased with respect to the first control sensitivity of said first control system in response to an increase in the magnitude of the output of said acceleration sensor means.

2. In a vehicle:
   an auxiliary steering control system and a drive power distribution system;
   acceleration sensor means; and
   control sensitivity setting means for varying first and second control sensitivities of the auxiliary steering control system and the drive power distribution system respectively, in response to the output of the acceleration sensor means, said control sensitivity setting means decreasing the magnitude of the first sensitivity of the auxiliary steering control system with respect to the second control sensitivity of the drive power distribution system in response to an increase in the magnitude of a parameter which varies with the output of said acceleration sensor means.

3. In a vehicle:
   vehicle acceleration sensing means;
   an auxiliary steering arrangement for varying the steering angle of at least one of a set of front and rear road wheels, said auxiliary steering arrangement including an auxiliary steering control unit which responds to a first set of control data input according to a first control sensitivity;
   a four wheel drive system including clutch means for varying the distribution of torque between the front road wheels and the rear road wheels of the vehicle, said four wheel drive system including a drive power distribution control unit which responds to a second set of control data input according to a second control sensitivity; and
   control sensitivity setting means for varying the first and second control sensitivities in response to the output of the acceleration sensor means, said control sensitivity setting means decreasing the magnitude of the first control sensitivity with respect to the second control sensitivity in response to an increase in the magnitude of a parameter which varies with the output of said acceleration means.

4. A vehicle as claimed in claim 3 further comprising:
   an active suspension arrangement which varies the load on the front and rear sets of road wheels, said active suspension arrangement including a third control unit which responds to a third data input according to a third control sensitivity and wherein said control sensitivity setting means varies the magnitude of the third control sensitivity with respect to at least one of the first and second control sensitivities in response to a change in the magnitude of a parameter which varies with the output of said acceleration means.

5. In a method of operating a vehicle system having first and second systems which modify vehicle handling, the steps of:
   sensing longitudinal vehicular acceleration;
   sensing lateral vehicle acceleration;
   determining the value of a first control sensitivity value which determines level of activity of the first system and a control gain value based on a parameter which varies as the sum of the squares of the longitudinal and lateral accelerations;
   determining the value of a second control sensitivity value which determines level of activity of the second system based on a parameter which varies as a ratio of the longitudinal and lateral accelerations; and
   modifying the value of second control sensitivity value using the control gain value.

6. In a method of operating a vehicle system having first and second systems which modify vehicle handling, the steps of:
   sensing longitudinal acceleration of the vehicle;
   increasing a first control sensitivity value which determines level of activity of the first system with respect to a second control sensitivity value which determines level of activity of the second system, in response to an increase in the sensed longitudinal acceleration.

7. In a method of operating a vehicle system having first and second systems which modify vehicle handling, the steps of:
   sensing longitudinal acceleration of the vehicle; and
   increasing a first control sensitivity value and decreasing a second control sensitivity value which determines level of activity of the second system, in response to an increase in the sensed longitudinal acceleration.

8. In a vehicle
   first and second systems which modify vehicle handling;
   mean for sensing longitudinal vehicular acceleration;
   means for sensing lateral vehicle acceleration;
   means for determining the value of a first control sensitivity value which determines level of activity of the first system and a control gain value based on a parameter which varies as the sum of the squares of the longitudinal and lateral accelerations;
   means for determining the value of a second control sensitivity value which determines level of activity of the second system based on a parameter which varies as a ratio of the longitudinal and lateral accelerations; and
   means for modifying the value of second control sensitivity value using the control gain value.

9. In a vehicle first and second systems which are operatively connected with a road wheel of the vehicle;

means for sensing longitudinal acceleration of the vehicle; and means for increasing a first control sensitivity value which determines level of activity of the first system with respect to a second control sensitivity value which determines level of activity of the second system, in response to an increase in the sensed longitudinal acceleration.

10. In a vehicle first and second systems which are operatively connected with a road wheel of the vehicle;

means for sensing longitudinal acceleration of the vehicle;

means for increasing a first control sensitivity value and decreasing a second control sensitivity value which determines level of activity of the second system, in response to an increase in the sensed longitudinal acceleration.

11. In a vehicle:

a source of servo power, said source being limited for the purposed of increasing fuel economy;

first and second systems which are operated by the servo power;

first and second control units which control the first and second systems, respectively, said first and second control units including means responsive to first and second control sensitivity values, respectively;

sensor means for sensing longitudinal acceleration of the vehicle; and control sensitivity value setting means which is responsive to the sensor means and which increased the first control sensitivity value with respect to the second control sensitivity value in a manner which permits efficient operation of the first and second systems on the limited servo power.

12. A total vehicle driving condition control system comprising:

a steering angle control unit which is operable to effect steering angle control for steering at least one of a set of front and rear wheels at a target steering angle when a vehicle is turned, said steering angle control unit determining the target steering angle based on a first preselected vehicle driving parameter and a first control sensitivity, said first control sensitivity representing a degree of priority to the activity of the steering angle control;

a wheel slippage control unit which is operable to effect wheel slippage control for modifying wheel slippage between the wheels, said wheel slippage control unit modifying the wheel slippage between the wheels based on a second preselected vehicle driving parameter and a second control sensitivity, said second control sensitivity representing a degree of priority to the activity of the wheel slippage control over that of the steering angle control;

a longitudinal acceleration sensor which detects longitudinal acceleration acting on the vehicle; and a main control unit operable to increase said second control senility while said first control sensitivity is decreased according to an increase in the longitudinal acceleration detected by said longitudinal acceleration sensor.

13. A total vehicle driving condition control system as set forth in claim 12, further comprising a lateral acceleration sensor which detects lateral acceleration acting on the vehicle and in that said main control unit mathematically determines the sum of the square of the longitudinal acceleration and the square of the lateral acceleration and increases a ratio of said second control sensitivity to said first control sensitivity when the sum is greater than a preselected value.

14. A total vehicle driving condition control system as set forth in claim 12, wherein said wheel slippage control unit includes a driving force distribution control unit which is operable to modify torque distributed between the front and rear wheels at a driving force distribution ratio determined in a preselected relation to the second preselected vehicle driving parameter and the second control sensitivity.

* * * * *